United States Patent
Bergen

(10) Patent No.: US 10,114,627 B2
(45) Date of Patent: Oct. 30, 2018

(54) DIRECT BUILD ASSISTANCE

(71) Applicant: salesforce.com, inc., San Francisco, CA (US)

(72) Inventor: Philip Bergen, Kihei, HI (US)

(73) Assignee: salesforce.com, inc., San Francisco, CA (US)

( * ) Notice: Subject to any disclaimer, the term of this patent is extended or adjusted under 35 U.S.C. 154(b) by 61 days.

(21) Appl. No.: 14/706,883

(22) Filed: May 7, 2015

(65) Prior Publication Data
US 2016/0077820 A1   Mar. 17, 2016

Related U.S. Application Data

(60) Provisional application No. 62/051,451, filed on Sep. 17, 2014.

(51) Int. Cl.
| | |
|---|---|
| *G06F 9/44* | (2018.01) |
| *G06F 9/45* | (2006.01) |
| *G06F 8/61* | (2018.01) |
| *G06Q 30/00* | (2012.01) |
| *G06F 8/71* | (2018.01) |
| *G06F 9/451* | (2018.01) |

(52) U.S. Cl.
CPC .................. *G06F 8/61* (2013.01); *G06F 8/71* (2013.01); *G06Q 30/016* (2013.01); *G06F 9/453* (2018.02)

(58) Field of Classification Search
CPC . G06F 8/65; G06F 8/20; G06F 9/4446; G06F 8/60; G06F 8/61–8/71; G06F 9/44505; H04L 41/082; G06Q 30/016
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

Yan Zhu, A Collaborative Framework for Privacy Protection in Online Social Networks, 2011, pp. 1-10. https://ieeexplore.ieee.org/stamp/stamp.jsp?tp=&arnumber=5766999 (Year: 2011).*

Ronald Petrlic, Privacy-Preserving Digital Rights Management in a Trusted Cloud Environment, 2012, pp. 1-6. https://ieeexplore.ieee.org/stamp/stamp.jsp?tp=&arnumber=6296076 (Year: 2012).*

Matthew Areno, Secure Mobile Authentication and Device Association with Enhanced Cryptographic Engines, 2014, pp. 1-8. https://ieeexplore.ieee.org/stamp/stamp.jsp?tp=&arnumber=6927180 (Year: 2014).*

(Continued)

*Primary Examiner* — Mongbao Nguyen
(74) *Attorney, Agent, or Firm* — Lowenstein Sandler LLP

(57) ABSTRACT

A tool for installing and configuring a software development environment with an embedded help feature is provided. The help feature may provide a user (e.g., developer) with technical assistance to resolve problems that occur when building software. In one example, the system may include a configuration tool that includes a help feature and installs and configures one or more software programs to build software. The software programs may include, for example, operating systems, source code editors, debuggers, software build tools or any component of a software development environment.

17 Claims, 5 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,148,083 A * | 11/2000 | Fieres .................. G06F 21/602 380/255 |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,629,267 B1 * | 9/2003 | Glerum ............... G06F 11/0715 714/26 |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,503,037 B2 * | 3/2009 | Banerjee ............. G06F 11/3676 717/120 |
| 7,620,655 B2 | 11/2009 | Larsson |
| 8,055,945 B2 * | 11/2011 | Compton ............ G06F 11/0709 714/26 |
| 8,321,836 B2 * | 11/2012 | Meijer .................... G06F 8/437 717/113 |
| 8,584,102 B2 * | 11/2013 | Need ......................... G06F 8/41 717/136 |
| 8,584,242 B2 * | 11/2013 | Lagar-Cavilla ....... G06F 21/566 726/24 |
| 8,589,880 B2 * | 11/2013 | Jones ................. G06F 11/3624 717/122 |
| 8,863,086 B2 * | 10/2014 | Chang ................. G06F 11/0742 717/124 |
| 9,021,436 B2 * | 4/2015 | Sathya ................ G06F 11/3656 717/124 |
| 9,672,012 B2 * | 6/2017 | Kizhakkevalappil ..... G06F 8/34 |
| 2001/0044791 A1 | 11/2001 | Richter et al. |
| 2001/0051928 A1 * | 12/2001 | Brody ..................... G06F 21/16 705/52 |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0065731 A1 * | 4/2003 | Mohammed ............ G06F 21/33 709/208 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0039169 A1 * | 2/2005 | Hsu ..................... G06F 11/3624 717/124 |
| 2005/0050555 A1 | 3/2005 | Exley et al. |
| 2005/0091098 A1 | 4/2005 | Brodersen et al. |
| 2006/0036991 A1 * | 2/2006 | Biazetti ................ G06F 9/4446 717/104 |
| 2007/0180509 A1 * | 8/2007 | Swartz .................. G06F 9/4406 726/9 |
| 2008/0126932 A1 * | 5/2008 | Elad ..................... G06F 9/4446 715/705 |
| 2009/0089751 A1 * | 4/2009 | Raikes .................. G06F 9/4446 717/120 |
| 2009/0293042 A1 * | 11/2009 | Nakagawa .......... G06F 11/3664 717/110 |
| 2010/0199132 A1 * | 8/2010 | Compton ............ G06F 11/0709 714/57 |
| 2011/0246964 A1 * | 10/2011 | Cox, III ..................... G06F 8/71 717/122 |
| 2011/0314438 A1 * | 12/2011 | Surazski ............. G06F 11/0742 717/100 |
| 2012/0030658 A1 * | 2/2012 | Hu ...................... G06F 11/3688 717/131 |
| 2013/0019306 A1 * | 1/2013 | Lagar-Cavilla ....... G06F 21/566 726/22 |
| 2013/0152047 A1 * | 6/2013 | Moorthi ................... G06F 11/368 717/124 |
| 2013/0159851 A1 * | 6/2013 | Pawar ................... G06F 9/4446 715/708 |
| 2014/0033193 A1 * | 1/2014 | Palaniappan ............ G06F 8/65 717/173 |

(56) References Cited

U.S. PATENT DOCUMENTS

| | | | | |
|---|---|---|---|---|
| 2014/0129612 A1* | 5/2014 | Hamilton | .............. | H04L 67/025 709/202 |
| 2014/0245262 A1* | 8/2014 | Hill | .......................... | G06F 8/70 717/120 |
| 2014/0282358 A1* | 9/2014 | Mowatt | ...................... | G06F 8/70 717/104 |
| 2015/0135160 A1* | 5/2015 | Gauvin | ................. | H04W 4/001 717/109 |
| 2015/0269060 A1* | 9/2015 | Rodmell | ............. | G06F 11/3664 717/124 |
| 2015/0319178 A1* | 11/2015 | Desai | .................... | G06F 9/4443 726/1 |
| 2016/0162905 A1* | 6/2016 | Singh | ...................... | G06F 21/31 705/304 |

OTHER PUBLICATIONS

Mironela Pirnau, The Analysis of the .NET Architecture Security System, 2013, pp. 1-6. https://ieeexplore.ieee.org/stamp/stamp.jsp?tp=&arnumber=6636185 (Year: 2013).*

Cheng, Li-Te, et al., "Jazzing up Eclipse with Collaborative Tools", http://www.watson.ibm.com/cambridge/Technical_Reports/2003/TR2003-12.pdf, 2003, 5 pages.

Hupfer, Susanne, et al., "Introducing Collaboration into an Application Development Environment", http://pi4.informatik.uni-mannheim.de/pi4.data/content/courses/2005-ss/cscw/material/jazz.pdf, Nov. 6, 2004, 4 pages.

\* cited by examiner

DIRECT BUILD ASSISTANCE

CROSS-REFERENCE TO RELATED APPLICATIONS

This application claims the benefit of priority of U.S. Provisional Patent Application No. 62/051,451, entitled "DIRECT BUILD ASSISTANCE," by Philip Bergen, filed on Sep. 17, 2014, the content of which is incorporated by reference herein in its entirety.

COPYRIGHT NOTICE

Portions of the disclosure of this patent document may contain material subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to computer software development and, more specifically, to providing assistance for development of software applications.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. The cloud computing environment may be a place to launch applications or a foundation upon which relevant applications may be built or sold. As an example, such environments may be applicable to the field of computer software development.

The process of building software applications may be complex and, as such, users that design and build software applications may require assistance. Accordingly, there is a desire to provide users with the tools needed to develop and build software applications.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1:
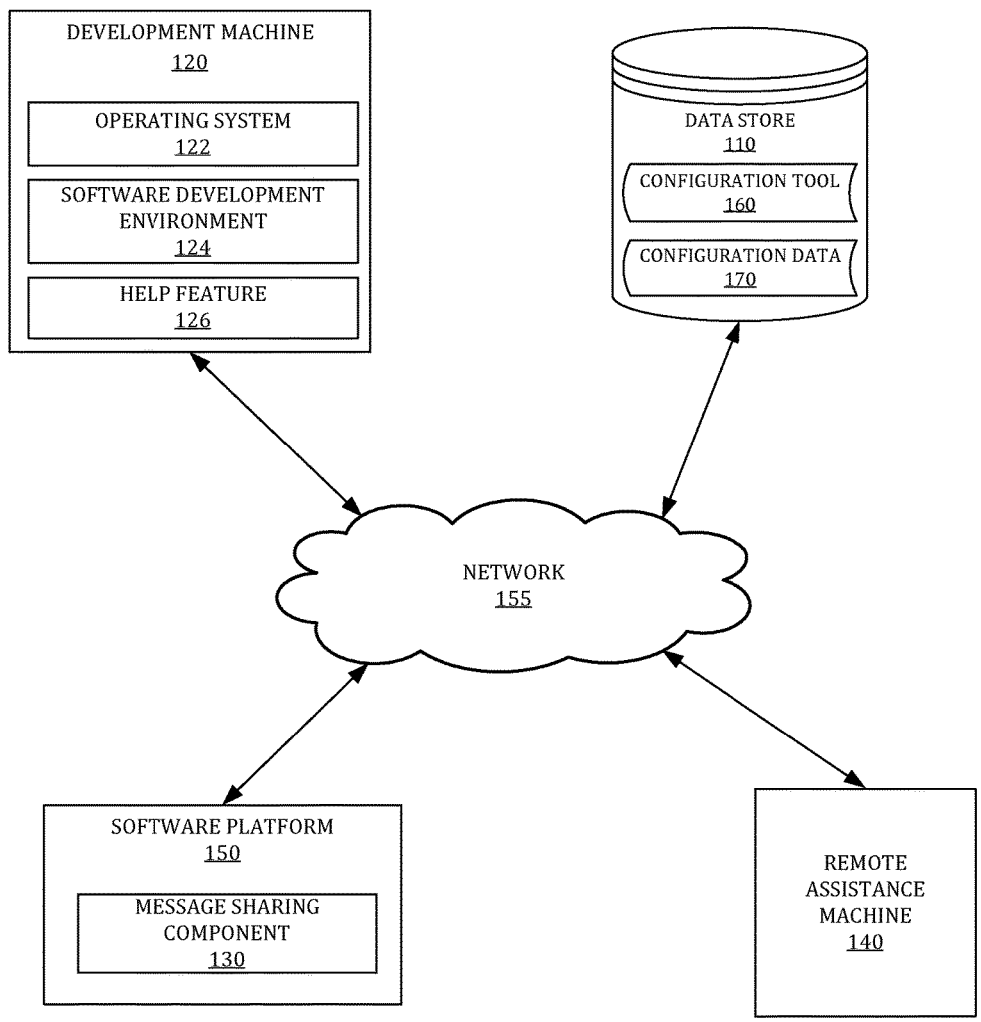
FIG. 1 is a block diagram illustrating an example environment having software development machines with integrated help features according to some implementations.

Examples of systems, computer-readable storage media and methods according to the disclosed implementations are described in this section. The examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Implementations for installing and configuring a software development environment with an embedded help feature are provided herein. The embedded help feature may provide a user (e.g., developer) with technical assistance to resolve problems that occur when building software. In one example, the system may include a configuration tool that includes a help feature and installs and configures one or more software programs to build software. The software programs may include, for example, operating systems, source code editors, debuggers, software build tools or any component of a software development environment.

The help feature may be integrated with one or more components of the operating system or software development environment or a combination of both. The system may activate the help feature when the system detects a problem in the machine's configuration, which may cause a software build to produce errors (e.g., fail). When the help feature is activated, the system may enable a cryptographic element on the development machine that is associated with a support user (e.g., technical support engineer). Enabling the cryptographic element may allow the support user to access the development machine from a remote machine using a secure communication channel. The secure communication channel may be used to transmit instructions that may help troubleshoot, diagnose or resolve a problem with the software build.

FIG. 1 is a block diagram illustrating an exemplary environment 100 that includes a configuration tool for configuring development machines with help features to assist with software development. Environment 100 may include a data store 110, a development machine 120, a message sharing component 130, a remote assistance machine 140 and a software platform 150, which may be interconnected via network 155. Network 155 may comprise a private network (e.g., local area network (LAN), wide area network (WAN), intranet) or a public network (e.g., the Internet).

Data store 110 may include a configuration tool 160 and configuration data 170, which may be used to modify development machine 120 to build software. Data store 110 may be directly accessible (e.g., local) or indirectly accessible (e.g., over a network) to development machine 120. Data store 110 may be a memory (e.g., random access memory), a drive (e.g., a hard drive), a flash drive, a database system, or other type of component or device capable of storing data. The data store 110 may also include multiple storage components (e.g., multiple drives or multiple databases) that may also span multiple computing devices (e.g., multiple server computers). In one example, configuration tool 160 and configuration data 170 may be consolidated into a single program that may be stored as one or more files on a network drive. In another example, configuration tool 160 and configuration data 170 may be stored in different data stores. For example, the configuration tool may be on a portable data storage device (e.g., flash drive) and when it is run on development machine 120 it may remotely access configuration data 170 on data store 110.

Configuration tool 160 may include a series of instructions that when run may modify the configuration of development machine 120. The configuration of a system may be defined by the programs installed on the machine as well as the configuration data associated with the installed programs. A program may refer to any sequence of instructions written to perform a specified task using a computer and may include compiled programs (e.g., executables, libraries, shared objects), non-compiled programs (e.g., scripts, batch files), work flows (e.g., business rules), formulas or other similar collections of instructions. Configuration data 514 may be data utilized by configuration tool 160 to determine what programs to configure on development machine 120 and how and when to configure them. Configuration tool 160 and configuration data 170 are described in more detail below in regards to FIG. 2.

Development machine 120 may be a computing system (e.g., personal computer, server, tablet, smartphone) that may be utilized by a user to develop software. Development machine 120 may include an operating system 122, a software development environment 124 and a help feature 126. Operating system 122 may include a proprietary or open source operating system, such as for example, Microsoft Windows®, Apple Macintosh®, Unix, Linux or other similar operating system.

Software development environment 124 may include one or more software applications that a user (e.g., developer) may use to write, build or test software. In one example, software development environment 124 may include source code editors, compilers, linkers, interpreters, debuggers, build automation tools, testing tools or other software components. Each of these components may be a standalone computer program or may be combined into an integrated tool, such as an integrated development environment (IDE). An integrated development environment may be a software program that provides a graphical user interface for multiple underlying software development components. Examples of integrated tools include, for example, Eclipse®, Microsoft Visual Studio® or other similar development tools. The software development environment 124 may also include or be coupled with a version control system, a bug tracking system, a deployment mechanism or a modeling tool. Help feature 126 may be configured to provide assistance with respect to any or all of these components.

Help feature 126 may be associated with operating system 122 or software development environment 124 or a combination of both and may provide a user with a mechanism to seek assistance from a local or remote source. In one example, help feature 126 may be integrated with software development environment 124 and may be initiated using a graphical or command line interface. Help feature 126 may passively monitor user actions or computing processes executed by software development environment 124 to determine whether assistance may be helpful. Help feature 126 may register or listen for events that may be used to trigger the help feature. The events may be events associated with the operating system or the software development environment or a combination of both. Triggering the help feature may involve enabling or presenting an interface to a user. In one example, the help features may listen for build related events or build failure events and when they occur may enable or present the help feature to the user. In one example, help feature 126 may include a help feature included as a plug-in with the build tool so that the developer can request assistance if a build fails.

Software platform 150 may host software applications developed by development machine 120 and may provide an on-demand computing service, such as an on-demand database service. Hosting the software application may involve, for example, executing the software applications to provide a service to a user or may involve storing and providing (e.g., selling) the software application to one or more users.

Software platform 150 may include message sharing component 130 that may receive messages initiated by help feature 126 and may provide these messages to other systems and users. In one example, message sharing component 130 may publish messages, for example, by utilizing message boards (e.g., forums), chat rooms or other similar message publication service. The published messages may be visible to all users or only those users associated with the user of development machine 120, such as only users in the same group or within the same organization or organizational unit (e.g., department). In another example, message sharing component 130 may receive a message and transmit (e.g., forward or broadcast) the message to other machines or users, for example, by using email, instant message, RSS feeds, texting or other message transmission mechanism. The messages may be sent to a single user or a group of users using specific identification information or an alias.

Remote assistance component 140 may receive the message initiated by help feature 126 and may connect with development machine 120. The connection may be manually initiated by a user of remote assistance machine 140 or may be automatically initiated in response to accessing or receiving a message. In one example, remote assistance machine 140 may be operated by a support user with knowledge of software development environment 124 and the support user may initiate a connection with development machine 120 to fix or enhance the software development environment.

Figure 2:
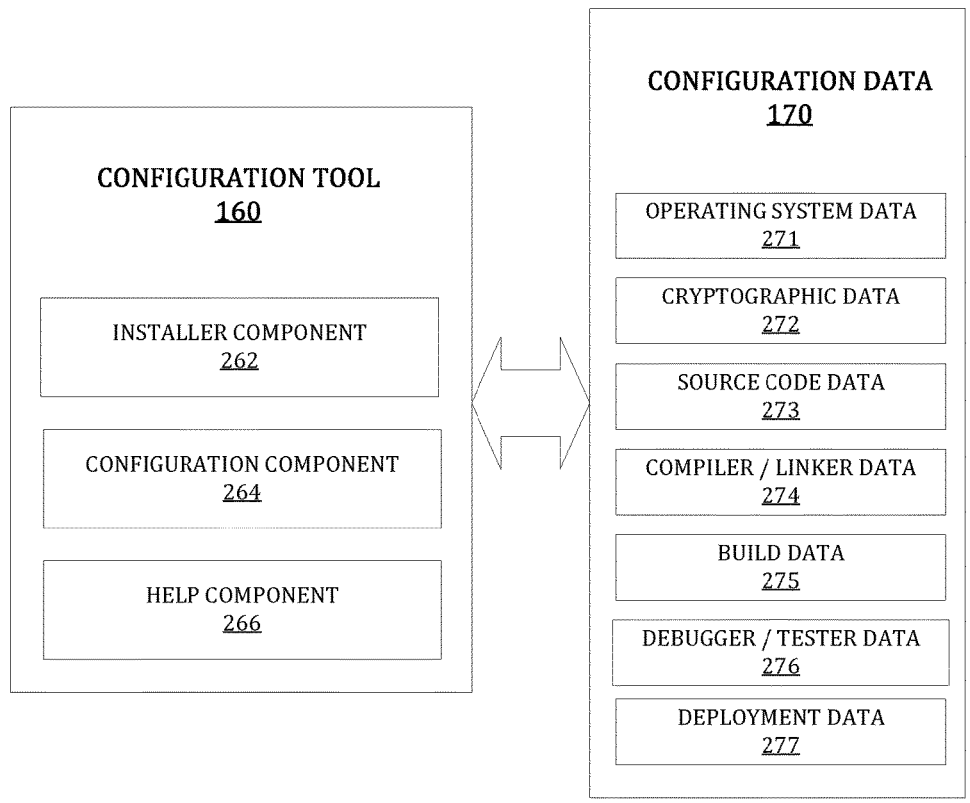
FIG. 2 is a block diagram illustrating aspects of a configuration tool and configuration data according to some implementations.

FIG. 2 depicts a block diagram illustrating an exemplary configuration tool 160 and configuration data 170 in more detail. As illustrated by the bidirectional arrow, configuration tool 160 may utilize configuration data 170 during its operation, for example, to determine what programs need to be installed and configured on development machine 120. Configuration tool 160 may include an installer component 262, a configuration component 264 and a help component 266.

Installer component 262 may include a series of instructions for installing programs (e.g., executables, scripts) onto development machine 120. Installer component 262 may utilize configuration data 170 to identify a list of programs that support the software development environment. Configuration tool 160 may inspect development machine 120 to identify which programs are installed and which programs are not installed. The inspection may analyze the product and version information to make the determination. Installer component 262 may also install any programs not previously installed on the development machine, in certain situations, this may include uninstalling an earlier or later version to install the version specified by configuration data 270. In one example, the installer component may include a dependency algorithm that constructs a dependency graph in view of the programs that are installed and those that are not installed. Installer component 262 may use the dependency graph to determine an order to install the programs.

Installing a program may involve any act of making a program ready to run (e.g., execute). The installation process may vary between programs and operating systems and may involve copying, moving, renaming, initiating, launching or in some way manipulating files, directories, database entries or other similar data structure. In one example, installer component 262 may interact with or utilize an installer. An installer may be embedded within an installation file or may be a component integrated with the operating system, for example, the installer may be a software package manager such as Microsoft Windows Installer® (MSI), Red Hat Package Manager® (RPM), Install Shield® or other installer. Installer component 262 may invoke the installer with information identifying one or more installation files (e.g., software packages).

Configuration component 264 may interact with installation component 262 and may modify the configuration of one or more installed programs. This may include populating information so that the program can function. The information may pertain to any of the below categories of configuration data. In one example, this may include modifying the windows registry or configuration files for the operating system or application. In another example, this may involve providing switches (e.g., command line flags) to an installation command or providing information for a configuration wizard.

Help component 266 may include one or more modules for enabling the help feature. In one example, help component 266 may include a module (e.g., plugin, driver, program) that may be installed into the operating system or into a portion of the software development environment to enable the operating system or software development environment to provide the help feature. In another example, help component 266 may function as the help feature, for example, it may be a module of the configuration tool that provides a graphical or command line interface and be accessed by the development machine. This would allow a user to invoke the configuration tool to activate the help feature.

Configuration data 170 may include different categories of data that may be used by configuration tool 160 to set up development machine 120. Configuration data may include locations of installation files as well as the configurations associated with the installation files. As shown in FIG. 2, configuration data 170 may include operating system data 271, cryptographic data 272, source code data 273, compiler and linker data 274, build data 275, debugger and tester data 276, and deployment data 277.

Operating system data 271 may include the location of operating system binaries and information for configuring the operating system. The operating system may be any operating system supported by the software development environment. This may include, for example, Microsoft Windows®, Apple Mac OS®, Linux® Unix or other similar operation system. In one example, the software development environment may support multiple operating systems in which case configuration tool 160 may install and configure multiple operating systems on multiple machines or on a single machine (e.g., dual boot or guest operating systems).

Cryptographic data 272 may include one or more programs or keys (e.g., tokens, digital signature and certificates) for enabling encrypted communication between systems. This may include enhancements to an operating system's communication stack. Cryptographic data 272 may include one or more cryptographic elements (e.g., public keys) that are associated with support users. The cryptographic elements may be public keys and may be mathematically linked or associated with a private key, wherein both the public key and private key are associated with a support user. In one example, a first cryptographic element may be associated with a first support user and a second cryptographic element may be associated with a different support user. Each cryptographic element may be associated with only one support user without being associated with the user of the development machine. In another example, the cryptographic element may be associated with a set of support users.

Source code data 273 may include the location of source code and software project information. In one example, this may identify a source control repository that may be associated with a revision control system. The revision control system may store versions of the source code (e.g., code base) as well as tools used to build, deploy and test the code.

Compiler and linker data 274 may identify the location and version of the compiler and linker used to build the software. Compiler and linker data 274 may also include setting used by the compiler or linker to build software. In some examples, the compiler or linker may be included within an integrated development environment.

Build data 275 may identify the location and settings of build tools and may define dependencies of a software project and how the software project is built. The build tools may include a variety of build related programs, such as for example, build automation tools such as Apache Maven®. The build data may reference the compiler and linker data 275 and may indicate the order in which source code is compiled and how to package the resulting binary files (e.g., executables, library, shared objects).

Debugging and Testing data 276 may identify the location and settings of debuggers and testing programs that may be used to test the resulting software builds.

Deployment data 277 may identify how a software build should be deployed (e.g., installed) on machines. Deployment data 275 may be related to packaging information of build data 275 and may be used to deploy the built software onto one or more machines. This may be useful for subsequent system level testing as well as testing across multiple heterogeneous operating systems.

Figure 3:
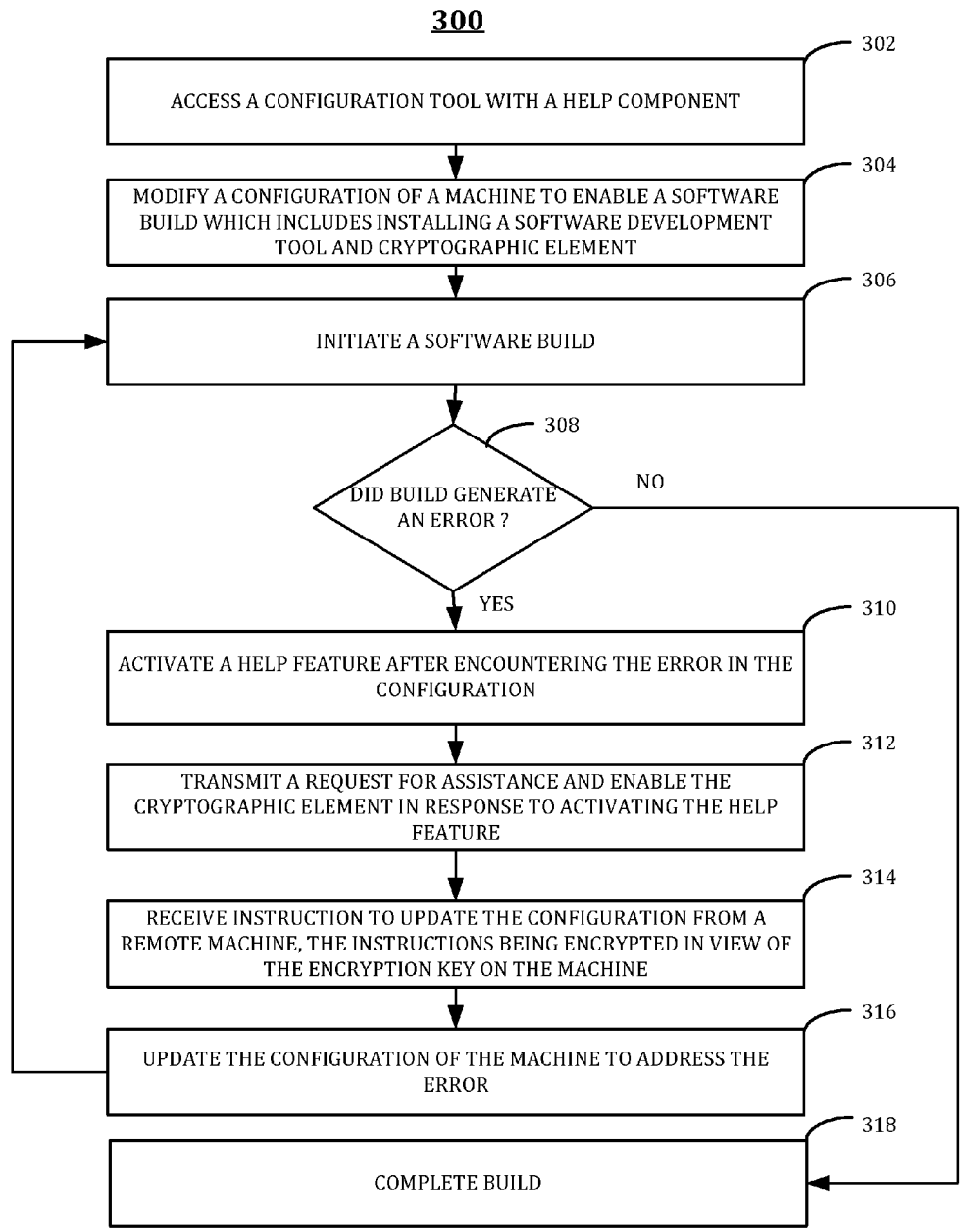
FIG. 3 is a flow diagram illustrating an example operation of a configuration tool and help feature according to some implementations.
Figure 4:
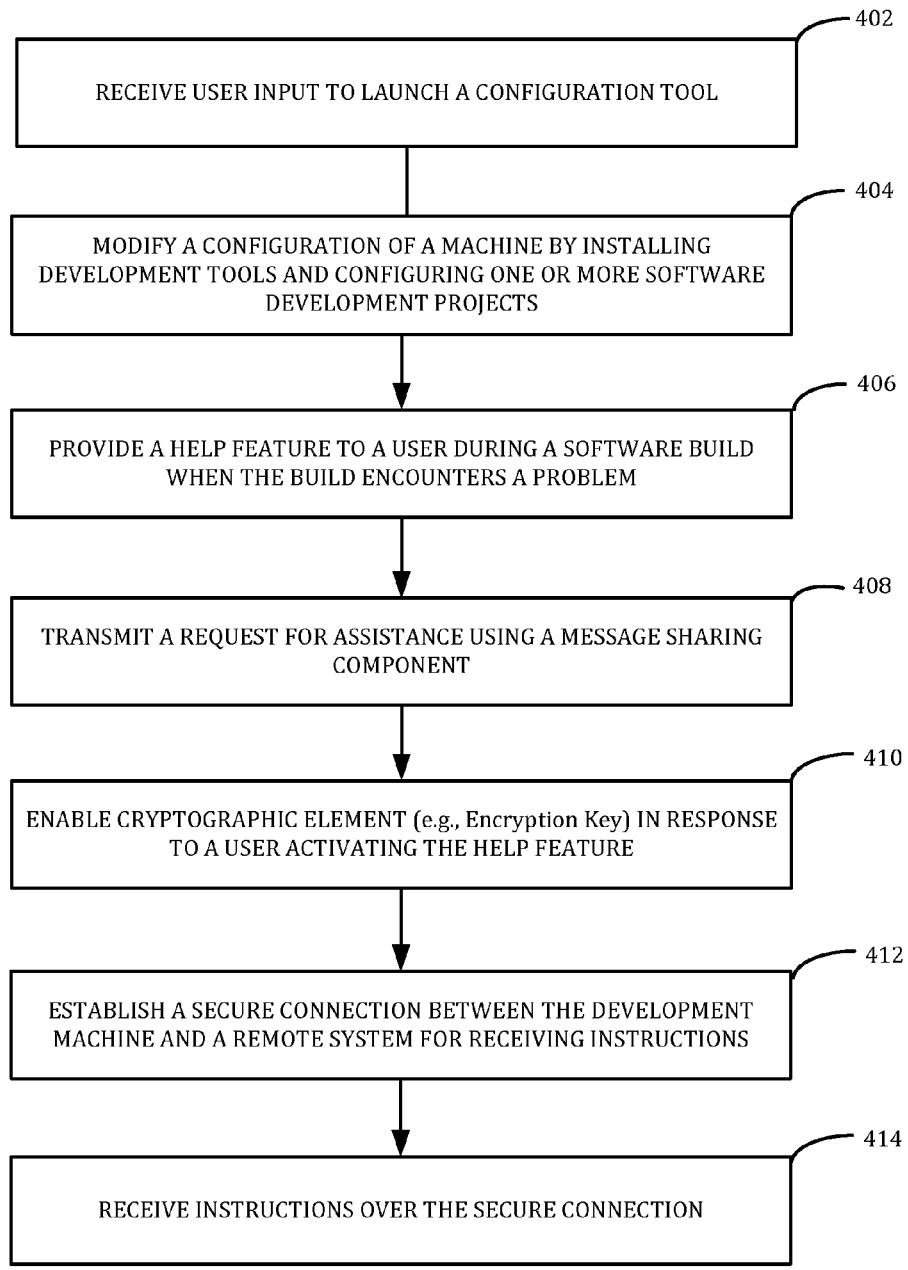
FIG. 4 is a flow diagram illustrating another example operation of a configuration tool and help feature according to some implementations.

FIGS. 3 and 4 depict flow diagrams of example methods 300 and 400, which may utilize the configuration tool and data discussed above to configure a software development environment with embedded help features to assist users (e.g., developers) with building software. Methods 300 and 400 may be performed by processing devices that may comprise hardware (e.g., circuitry, dedicated logic), software (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing device. Alternatively, methods 300 and 400 may be performed by two or more processing devices, each processing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by configuration tool 160 as shown in FIG. 1.

Referring to FIG. 3, method 300 may be performed by one or more processing devices of one or more machines and may begin at block 302. At block 302, the processing device may access a configuration tool with a help component. The configuration tool may be stored in a data storage that is remote or local to the development machine, for example, the configuration tool may be located on a network drive, a portable data storage (e.g., flash drive, portable hard drive), an attachment to a message or other storage location (e.g., URL). Assessing the configuration tool may involve a user of the development machine navigating to the location, which may copy or download the configuration tool to the development machine.

At block 304, the processing device may modify the configuration of the machine to enable a software build, which may include installing a software development tool and a cryptographic element. The configuration of the machine may be defined by the programs installed on the machine and the configuration data associated with the programs. Installing a software development tool may involve copying one or more programs used for the software development environment onto the development machine. In one example, modifying the configuration of the machine may also involve installing an operating system, a source code editor and a debugger, which may enable a developer to write software code and test the built software.

At block 306, the processing device may initiate a software build. In one example, the configuration tool may install or configure an interface (e.g., graphical user interface (GUI) or command line interface (CLI)) that may receive user input to initiate a software build. In another example, the configuration tool itself may initiate the build after receiving input from a user or after completing the installation of the software development environment.

At block 308, the processing device may determine whether the build generated an error. This may be done by registering or listening for error related events generated by the operation system or any program (e.g., executable, script, batch file) associated with the software build environment. The term error may include any event relating to an error, warning or informational message generated by the operating system or software development environment and associated with the build, whether before, after or during performance of the build. In some situations, an error may result in a failure of the software build, whereas in other situations a build may complete despite the error. In the latter situation, the error may indicate a problem exists with the build process, for example, even though there were no compiler or linker problems there may be subsequent run-time problems (e.g., compatibility issues).

At block 310, the processing device may activate a help feature after encountering an error in the configuration. The error in the configuration may have caused the software build to fail. In one example, activating a help feature may be performed in response to receiving user input. The user input may be a graphical input, such as for example, selecting a toolbar button or menu entry by clicking, scrolling, typing, navigating or other similar input. The user input may also be based on a command line interface, such as for example, entering a command with a help flag. Therefore, activating the help feature may involve a user selecting a help button or executing a help command using a command line interface. In another example, the processing device may activate a help feature without user input or may activate the help feature and prompt user to allow a help request to proceed.

At block 312, the processing device may transmit a request for assistance and enable a cryptographic element in response to activating the help feature. The request for assistance may include a message with a description of the error. The message may be transmitted to a message sharing component and may be included within a forum. The forum may be visible to multiple software developers within an organizational unit (e.g., division, department, group) without being visible to a user external to the organization unit.

Enabling the cryptographic element (e.g., key) may involve configuring the machine to communicate with another machine in view of the cryptographic element. In one example, the cryptographic element may correspond to a personalized encryption key (e.g., public key) for a support user logged into a remote machine and enabling the cryptographic element may involve configuring the machine to accept connections in view of the cryptographic element. Configuring the machine to accept connections may involve initiating or ensuring that a service (e.g., daemon) can establish a secured connection with a remote machine (e.g., over the network). The service may support a cryptographic communication protocol (e.g., encrypted network protocol) that is proprietary or standardized, such as for example one that utilizes secure sockets layer (SSL), transport layer security (TLS), internet protocol security (IP Sec) or other similar communication protocol with enhanced security. In one example, the service may allow textual and/or graphical data to be exchanged over a secure channel between two computers in order to provide confidentiality and integrity of data, similar to a Secure Shell (SSH).

At block 314, the processing device may receive instructions from a remote machine that update the configuration of the machine and the instructions may be encrypted in view of the cryptographic element. The instructions may include any operation used to modify the configuration of the operating system or software development environment. The instructions may be in the form of command line commands, mouse movements and clicks, configuration files, registry scripts, macros or other similar operations. In one example, the instructions may modify a user account to enhance user permissions or create or modify an environment variable so the software environment can access or create the appropriate files. In another example, the instructions may reinstall and configure a feature required by the build, such as installing a version of an operating system library (e.g., dynamic link library (DLL), shared object (SO)) for a tool to function or relied on by the source code.

The remote machine may be a machine separated from the development machine by a network communication channel. In one example, the remote machine may be operated by a support user and the instructions to update the configuration are provided by the support user. The remote machine may include processing logic that enables the machine to remotely diagnose an error in the configuration and generate one or more options to trouble shoot or address the error. The options may then be presented by either the remote machine or the development machine to its respective user and subsequently executed on the development machine. This may enable either the support user or developer to select which instructions to use.

At block 316, the processing device may update the configuration of the machine to address the error. Updating the configuration may include utilizing the instructions to modify the configuration and enable the software build. Once the configuration has been updated the processing device may branch back to block 306 and initiate the software build. If the build does not generate an error (e.g., successful build) the processing device may proceed to block 318.

At block 318, the processing device may complete the build. Completing the build may include steps that occur after the software code has been compiled, such as for example, packaging binaries or adding build artifacts to a version control system. Once the build has completed, the processing device may launch, deploy or test the build. These steps may be initiated by the configuration tool or may be setup by the configuration tool to occur without additional user interface once the build has completed.

Responsive to completing the operations described herein above with references to block 318, the method may terminate.

In another example of method 300, the processing device may subsequently publish instructions to inform others of a solution. In one example, the user configuration tool may send a message to a message sharing component, which may publish the solution by, for example, linking it to the original request or to a similar help request.

Referring now to FIG. 4, method 400 is another example operation configuring a software development environment with embedded help features to assist users (e.g., developers) with building software. Method 400 may begin at block 402, where the processing device may receive user input to launch a configuration tool.

At block 404, the processing device may modify a configuration of a machine by installing development tools and configuring one or more software development projects. This may include installing development tools and configuring development projects. The configuration tool may install Perforce tools, Code Collaborator, Eclipse, Oracle SQL Developer, Brew (Binary Runtime Environment for Wireless), XQuartz, Java, and other useful development tools as part of the software development environment. In one example, the configuration tool may also initiate a software build and launch the software development projects in the software development environment. In another example, the configuration tool may initiate a remote build and remotely launch the software development project on a software platform (e.g., element 150 in FIG. 1), which may be remote from the development machine.

At block 406, the processing device may provide a help feature to a user during a software build if the build encounters a problem. Although the configuration tool may be designed to completely automate the configuration, build problems may still arise. The help feature may be installed into the software development environment, for example as a plug-in within an integrated development environment (IDE) or one of the other programs involved in the build. The help feature may allow the developer to request assistance to complete a successful build. In one example, a developer can ask for help when a build command fails by using a point-and-click widget that may be labeled "HELP" or by a direct command configured for the build tool, such as, for example "ct—help-me 'My build has failed, I have tried everything!.'" In the latter use case, a first term of the command is "ct" and indicates a request for the configuration tool (CT) to perform a defined action. The second term of the command is "—help-me" and indicates the specific action/command that the machine is being asked to perform, e.g., a defined plug-in routine "help-me" as will be described below. The third term of the command is the phrase in quotes "'My build has failed, I have tried everything!'" which adds the quoted text as a comment to accompany the request for the "help-me" action. In another example, a widget could also be configured to implement a point-and-click feature with similar functionality.

At block 408, the processing device may transmit a request for assistance using a message sharing component. In one example, this may involve the development machine sending a request (e.g., help message) using the message sharing component to a support user or to a forum accessible to a support user. The request may provide information concerning the error in the configuration. The information may include, for example, error messages and configuration data of the software development environment and operating system. In one example, the information may include a machine identifier (e.g., host name), user identifier (e.g., user name), installation location or other similar information.

At block 410, the processing device may enable the cryptographic element (e.g., encryption key) in response to a user activating the help feature. For example, upon receiving a help command, the processing device may configure a service (e.g., SSH) to include the cryptographic element (e.g., a public key). This may be done by moving or copying a cryptographic element into a specified location for the service so that the service can accept connections from a user associated with the cryptographic element. This may enable the development machine to establish an encrypted connection with another machine.

At block 412, the processing device may establish a secure connection between the development machine and a remote machine for sending and receiving instructions. This may allow a support user to log into a development machine using his public key credentials. In one example, this may allow the support user to access the development machine using the credentials of the user on the development machine, as opposed to the support user's credentials.

At block 414, the processing device may receive instructions over the secure connection. These instructions may allow the support user to troubleshoot and diagnose the error in the configuration. Once the support user has finished, the configuration tool may remove the cryptographic element (e.g., public key) which may avoid subsequent unauthorized access. There may be additional communication (e.g., discussion) before after or during the secured connection using a message sharing component.

Responsive to completing the operations described herein above with references to block 414, the method may terminate.

Figure 5:
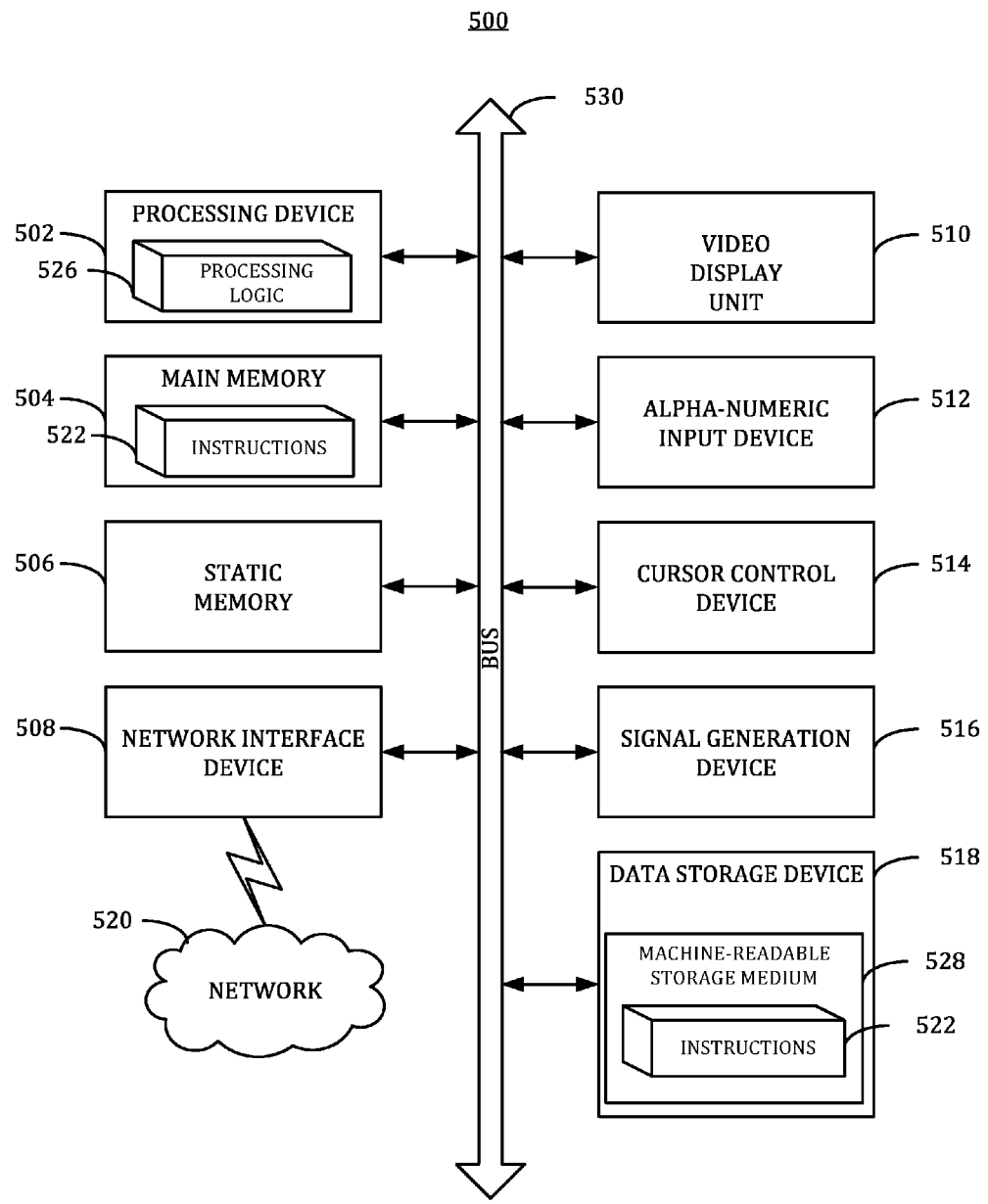
FIG. 5 is a diagrammatic representation of a machine in the exemplary form of a computer system configured to perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 may be comprised of a processing device 502, a main memory 504 (e.g., read-only memory (ROM), flash memory, dynamic random access memory (DRAM) (such as synchronous DRAM (SDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute processing logic 526 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 528 having one or more sets of instructions 522 (e.g., software) embodying any one or more of the methodologies or functions described herein. Instructions 522 may also reside, completely or at least partially, within main memory 504 and/or within processing device 502 during execution thereof by computer system 500; main memory 504 and processing device 502 also constituting machine-readable storage media. Instructions 522 may further be transmitted or received over a network 520 via network interface device 508.

Machine-readable storage medium 528 (e.g., computer-readable storage medium) may also be used to store instructions for managing a trust. While machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
modifying, by a hardware processor, a configuration of a client machine to enable a software build, the configuration comprising a software build tool and a cryptographic element of a support user account, wherein the modifying the configuration of the client machine comprises installing, within an operating system on the client machine, the software build tool and the cryptographic element;
activating, by the hardware processor, a help feature of the client machine responsive to encountering an error in the configuration of the client machine;
in response to activating the help feature:
transmitting, by the hardware processor, a request for assistance to a remote assistance machine, the request including a description of the error; and
enabling, by the hardware processor, the cryptographic element of the support user account by configuring the client machine to accept a connection from the remote assistance machine using the cryptographic element of the support user account;

receiving, by the hardware processor, from the remote assistance machine, computer instructions to resolve the error, the computer instructions being encrypted using the cryptographic element associated with the support user account on the client machine; and updating, by the hardware processor, the configuration of the client machine by executing the computer instructions to resolve the error and enable a successful software build.

2. The computer-implemented method of claim 1, wherein the error in the configuration causes the software build to fail.

3. The computer-implemented method of claim 1, wherein the description of the error is included within a forum visible to multiple software developers within an organization.

4. The computer-implemented method of claim 1, wherein the cryptographic element on the client machine corresponds to a personalized encryption key for a support user logged into the remote assistance machine.

5. The computer-implemented method of claim 1, wherein modifying the configuration of the client machine further comprises installing the operating system, a source code editor and a debugger on the client machine.

6. The computer-implemented method of claim 1, wherein activating a help feature comprises selecting a help button or executing a help command using a command line interface.

7. A computer system comprising:
a memory; and
a hardware processor communicatively coupled to said memory, said hardware processor configured to:
  modify a configuration of a client machine to enable a software build, the configuration comprising a software build tool and a cryptographic element of a support user account, wherein to modify the configuration of the client machine comprises to install, within an operating system on the client machine, the software build tool and the cryptographic element;
  activate a help feature of the client machine responsive to encountering an error in the configuration of the client machine;
  in response to activation of the help feature:
    transmit a request for assistance to a remote assistance machine, the request including a description of the error; and
    enable the cryptographic element of the support user account through the configuration of the client machine to accept a connection from the remote assistance machine using the cryptographic element of the support user account;
  receive computer instructions from the remote assistance machine to resolve the error, the computer instructions being encrypted through use of the cryptographic element associated with the support user account on the client machine; and
  update the configuration of the client machine through execution of the computer instructions to resolve the error and enable a successful software build.

8. The computer system of claim 7, wherein the error in the configuration causes the software build to fail.

9. The computer system of claim 7, wherein the description of the error is included within a forum visible to multiple software developers within an organization.

10. The computer system of claim 7, wherein the cryptographic element on the client machine corresponds to a personalized encryption key for a support user logged into the remote assistance machine.

11. The computer system of claim 7, wherein to modify the configuration of the client machine further comprises the hardware processor to install the operating system, a source code editor and a debugger on the client machine.

12. The computer system of claim 7, wherein to activate a help feature comprises a selection of a help button or execution of a help command using a command line interface.

13. A non-transitory computer-readable storage medium programmed to include instructions that, when executed by a hardware processor, cause the hardware processor to perform a plurality of operations comprising:
  modifying, by the hardware processor, a configuration of a client machine to enable a software build, the configuration comprising a software build tool and a cryptographic element of a support user account, wherein the modifying the configuration of the client machine comprises installing, within an operating system on the client machine, the software build tool and the cryptographic element;
  activating, by the hardware processor, a help feature of the client machine responsive to encountering an error in the configuration of the client machine;
  in response to activating the help feature:
    transmitting, by the hardware processor, a request for assistance to a remote assistance machine, the request including a description of the error; and
    enabling, by the hardware processor, the cryptographic element of the support user account by configuring the client machine to accept a connection from the remote assistance machine using the cryptographic element of the support user account;
  receiving, by the hardware processor, from the remote assistance machine, first computer instructions to resolve the error, the first computer instructions being encrypted using the cryptographic element associated with the support user account on the client machine; and
  updating, by the hardware processor, the configuration of the client machine by executing the first computer instructions to resolve the error and enable a successful software build.

14. The non-transitory computer-readable storage medium of claim 13, wherein the error in the configuration causes the software build to fail.

15. The non-transitory computer-readable storage medium of claim 13, wherein the description of the error is included within a forum visible to multiple software developers within an organization.

16. The non-transitory computer-readable storage medium of claim 13, wherein the cryptographic element on the client machine corresponds to a personalized encryption key for a support user logged into the remote assistance machine.

17. The non-transitory computer-readable storage medium of claim 13, wherein modifying the configuration of the client machine further comprises installing the operating system, a source code editor and a debugger on the client machine.

* * * * *